(12) United States Patent
Owhadi

(10) Patent No.: US 7,096,430 B2
(45) Date of Patent: Aug. 22, 2006

(54) PROCESS AND APPARATUS FOR DISPLAYING DATA ON A SPECIFIC AREA OF THE SURFACE OF THE DISPLAY IN A COMPUTER OR AN INTERACTIVE TERMINAL

(75) Inventor: Eric Owhadi, Sassenage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 10/228,283

(22) Filed: Aug. 27, 2002

(65) Prior Publication Data

US 2003/0048306 A1  Mar. 13, 2003

(30) Foreign Application Priority Data

Aug. 27, 2001 (EP) ................... 01480079

(51) Int. Cl.
G06F 15/00 (2006.01)
G03F 3/00 (2006.01)
(52) U.S. Cl. ............... 715/765; 715/763; 345/629
(58) Field of Classification Search ............. 715/763, 715/765, 738, 744; 345/629, 213
See application file for complete search history.

(56) References Cited

U.S. PATENT DOCUMENTS

| 5,877,741 | A | 3/1999 | Chee et al. |
| 6,002,411 | A | 12/1999 | Dye |
| 6,333,750 | B1 * | 12/2001 | Odryna et al. .............. 345/629 |
| 6,483,516 | B1 * | 11/2002 | Tischler ..................... 345/552 |

FOREIGN PATENT DOCUMENTS

| EP | 0 814 401 A2 | 12/1997 |
| WO | 01/61484 A2 | 8/2001 |

* cited by examiner

Primary Examiner—Cao (Kevin) Nguyen

(57) ABSTRACT

Data or a message is displayed in a specific area of a display of a computer or an interactive terminal by using a local access network (LAN) card having processing resources and connected to a network, and a video card having a frame buffer. The LAN card takes control of the video card frame buffer independently of an operating system running into the computer or interactive terminal. Preferably, the LAN card and video card are connected to the computer by a PCI bus and the frame buffer of the video card is controlled by a PCI bus master mode.

8 Claims, 2 Drawing Sheets

PROCESS AND APPARATUS FOR DISPLAYING DATA ON A SPECIFIC AREA OF THE SURFACE OF THE DISPLAY IN A COMPUTER OR AN INTERACTIVE TERMINAL

RELATED APPLICATIONS

The present application is based on, and claims priority to European Application Serial Number 01480079.1, filed Aug. 27, 2001, the disclosure of which is hereby incorporated by reference herein in its entirety.

TECHNICAL FIELD OF THE INVENTION

The invention relates to data communication systems and more particularly to a process and apparatus for displaying data on a specific reserved area of a display of a computer or an Interactive terminal.

BACKGROUND ART

Many locations opened to the public are now equipped with computers and so-called interactive terminals which are dedicated to provide instant-on access to information and services, particularly electronic services through the Internet network. Generally speaking, when such services are not separately billed by e-service providers and the manufacturers of Information Technology, they are financed through an advertisement policy based on the display of advertisement windows and panels which are simultaneously displayed to the customer as the customer is using the computer or the interactive terminal.

Clearly, in such a situation, the service provider or the product manufacture has a strong interest in keeping control of what is currently displayed to a customer, particularly as the customer is using the system. As the computer or the Interactive Terminal can be installed with a wide number of software and operating systems, the service provider or the product manufacturer normally has very little control of what is currently displayed on the user's computer, since the computer of the interactive terminal can always be the subject of new software installations or configuration changes. In particular, the service providers or product manufacturers have no certainty about what is actually displayed to the customer as the customer is using the system. The same concern is shared by Corporations which may wish to keep the possibility of having a direct access to inform their employees, regardless of the particular computer or Operating System the employees use.

More generally, the security concerns which are shared by any user of an Information Technology system and the risk of exposure of sensitive data to malevolent intrusions, particularly in view of the high number of suspicious software which is likely to be installed—most often out of the awareness of the customer—clearly shows the importance of securing a particular area of the display for a specific 'trusted' use, out of control of the particular Operating System being employed, and the particular set of software being installed.

SUMMARY OF THE INVENTION

It is an object of the present invention to provide a process and apparatus controlling a specific area of a display of a computer or an Interactive Terminal.

Another object is to increase security of information which is displayed in such computers and Interactive Terminals.

These objects are achieved by means of a process of controlling a specific area of a display of a computer or a interactive terminal having a main processor with an operating system, said computer or interactive terminal comprising a Local Area Network (L.A.N.) access means having processing resources and connected to a network, and a graphic system having a frame buffer including an Overlay Frame Buffer which is activated. The process involves the direct control of the graphic system by the processing system located on the LAN access means for the purpose of controlling the display of a specific windows or panel to the user, out of control of the main processor.

Preferably, the LAN access means card and the graphic systems are respectively based on a LAN card and a video card which are connected to the computer by means of a common P.C.I/AGP bus The control of an Overlay Frame Buffer of the video card is achieved by a bus master mode.

In one particular embodiment, the Overlay Frame Buffer has a WRITE access which is restricted to the LAN card. This causes the data to be displayed in a secured area of the display, and which remains out of control of the main Operating System. The process is particularly adapted to the display of advertisement panels in a personal computer or in an interactive terminal that provides instant-on access and facility to the public. Because of the network connection, the system provider is ensured (1) that the specific area of the display controlled by the Overlay Frame Buffer displays the particular panel or overlay window received through the network and (2) that information is actually displayed to the user.

The invention can be also used within corporate networks to allow a corporation to keep direct control of a specific area of the display of their employees' computers and to provide a direct and instantaneous access to the display of the employees, whatever the particular operating system and software configuration.

Preferably, the LAN card receives data and commands from the network in accordance with a protocol which defines the information which is to be displayed in said secured area of said display, the set of commands being used for taking control, in PCI bus master mode, of the contents of the frame buffer independently of the existing Operating system.

In one embodiment, the process uses a set of registers which are used for defining the particular location of the reserved area of the display and the contents of the registers are controlled by the user who is allowed to move,—but not to suppress—what is displayed on the specific reserved area.

In another embodiment, the overlay frame buffer is used for receiving sensitive data and the video card prevents access to such data to the main processor operated under the operating system of the computer. Therefore, there is provided a secured area of the display which can be 'trusted' and which can not be access abusively in particularly, the corresponding data cannot be copied to the disk drives.

Alternatively, in addition to the WRITE access restriction, the Overlay Frame Buffer has a READ access which is prohibited for the purpose of ensuring the confidentiality of the information being displayed.

The invention also provides a personal computer or Interactive Terminal which comprises a Local Access Network (L.A.N.) access means, such as a PCI or AGP type LAN card, for receiving data and commands from a network fitted with processing means for processing said data and commands. A graphic system, such as a PCI or AGP type video card, having a frame buffer is dedicated to store the data to be displayed on the display of said computer or said interactive terminal. The transmission of the data to be displayed on said secured area and the control of the graphic system are achieved by means of a bus master mode for allowing direct control of the secured area of the display irrespective of the existing Operating System.

BRIEF DESCRIPTION OF THE DRAWINGS

An embodiment of the invention will now be described, by way of example only, with reference to the accompanying drawings, wherein.

DETAILED DESCRIPTION OF THE DRAWING

Figure 1:
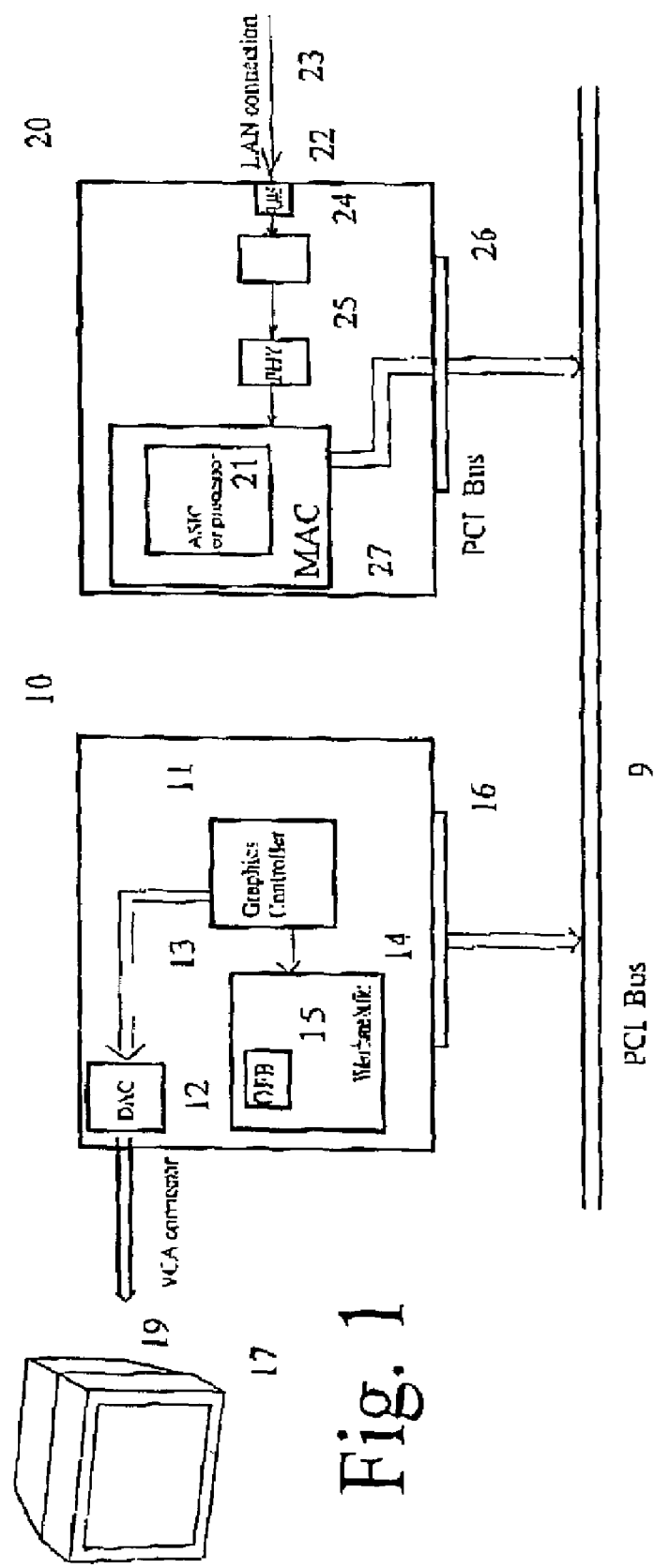
FIG. 1 is an illustration of a general architecture of a preferred embodiment where a LAN card takes the control via PCI bus master mode of the frame buffer of a video card.

The drawing will be particularly described in reference with the use of an Operating System (O.S.), such as of the type WINDOWS™ MX or WINDOWS 2000 marketed by MICROSOFT Corp., or a LINUX operating system or any other Operating System. The Operating System provides an operational environment for a wide number of software. Typically, in an Interactive Terminal a computer fitted with network connection is made available to the customer and, when such a service is not separately billed to that customer, the computer provider will need to ensure that a specific area of the display will serve for displaying specific messages or advertisement windows.

The computer or Interactive Terminal includes a graphic system which may be based on a custom video card 10, as shown in FIG. 1, which is connected via a Peripheral Component Interconnect PCI bus 9 to the mother board of the processor or the interactive terminal comprising the main processor. It should be clear that the PCI bus can be advantageously replaced by an Accelerated Graphic Port (A.G.P.) bus. For the sake of clarity, the description will refer to a PCI card, while it is clear that one of ordinary skill in the art can straightforwardly adapt the design to suit the AGP format, if required. The Video card 10 is plugged into a corresponding PCI slot which is available on a mother board (not represented). The video card 10 is fitted with a graphic controller or engine 11 which produces the graphic signals in accordance with the bitmaps or graphical commands received from the main processor via the PCI bus or the AGP bus. Graphic controller 11 generally takes the form of a specialized integrated circuit, such as an ASIC chip, and which provides the control of one or more screens or displays. FIG. 1 illustrates the control of one conventional Cathode Ray Tube (CRT) display, but it is clear that graphic controller 11 can also be used for controlling different types of displays and different types of signals: flat panels, LCD screens, Thin Flat Transistors (TFT), digital displays.

Graphic controller 11 comprises a frame buffer 14 or 'on screen' which comprises, at any particular time, a bitmap view of the image being displayed on the screen. The size of the words which is contained in frame buffer 14 depends on the depth of the color which is desired in the configuration being considered. Graphic controller 11 has two functions. A first function consists in building the image which is stored in the frame buffer in accordance with the bitmap or graphic control information provided by PCI bus 9. Further, graphic controller 11 uses the contents of the frame buffer 14 for generating the graphic signals which clearly depend on the nature of the display 21. In the case of a CRT display, for instance, a digital to analog connector (DAC)12 connected to graphic engine 11 via a bus 13 is used for generating the three analog colors and the synchronization signals, as known by one of ordinary skill in the art. If the graphic controller 14 is designed to control a digital display, the graphics signals are directly derived from the contents of the frame buffer 14 in order to control the digital display.

Display 17 receives the graphic channel issued by the graphic controller 11 on a bus 19 connected to a video graphics array (VGA) connector and carrying the above mentioned graphic signals. In a CRT screen as represented in the figure, the graphic signals will comprise the analog signals, clearly the green, blue and red signals associated with the horizontal and vertical synchronization signals. In the case of a digital display, the graphic controller 11 will provide digital graphic signals accordingly in accordance with the particular digital format which is used. Two formats are traditionally used for coding the digital graphics signals, either the Time Multiplex Differential Signals (TMDS) or the Low Voltage Differential Signal (LVDS) well known in the art.

Frame buffer 14 is a specific storage having sufficient memory space such as those used for 2D and 3D accelerations. As the frame buffer 14 has a size which is well beyond the memory space required for displaying the graphical image on the computer of the system, the frame buffer is divided into different areas which are arranged and used for accelerating the construction of graphical displays. In a technique known as the double buffering technique for instance, the frame buffer 14 includes first and second areas. The first area is used for defining the image which is currently displayed under control of the video card 10, while the second area serves to elaborate the next image to be displayed. In the case of video acceleration techniques, the frame buffer 14 includes a video storage area which is used for storing the video data stream which is displayed as an overlay with respect to the background image.

The control of the specific areas of the frame buffer which are displayed is defined by a set of addresses stored within corresponding registers which are used by the graphic engine 11 via the numerous primitives for video acceleration. For instance an X address is used for defining the first position within the frame buffer of the current image, and a Z address defines the position within the frame buffer of the video data stream to be displayed in the foreground. A set of primitives is available to the graphic engine 11 to control the different areas of the frame buffer 14 and the associated registers. The graphic engine 11 can then issue the resulting image which is transmitted to the DAC 12 via bus 13.

Clearly, the particular organization of the frame buffer 14 closely depends on the particular design of the video card. In the case of the video accelerating technique, the control of the display of the video data stream is either based on one particular bit of the alpha channel (corresponding to one bit among the $25^{th}$ to the $32^{th}$ bit if the pixels are coded in 32 bits) or upon the detection of a specific color existing within the frame buffer in the case of 24-bit coded pixels. The use of frame buffers is well known in the art of graphic cards design and the concept of frame buffers will not be further discussed.

Frame buffer 14 includes an Overlay frame buffer 15 which is activated in a manner contrary to the standard video card where the activation is controlled by the drivers of the video card, in turn controlled by the operating system. Overlay frame buffer 15 is used for storing data or messages which are to be displayed on a reserved area of the display of the computer or the Interactive Terminal and is associated with corresponding primitives which can be used by graphic engine 11. In one embodiment, the particular location of the reserved display area is fixed while, alternatively, an associated Z address is still accessible for control of the driver of the operating system for the purpose of letting the user move the corresponding displayed window or message, while not allowing him or her to suppress it.

A Local area Network (LAN) card 20 is also connected to the PCI bus 9 of the computer. While FIG. 1 shows a LAN card 20 and a video card 10 sharing the same PCI bus, it should however be clear that two distinctive buses could be used, particularly if the video card 10 is connected to a AGP bus and the LAN card is connected to the PCI bus. However, the figure will be described with the use of a single PCI bus that is connected to both the video card 10 and the LAN card 20. The LAN card 20 has processing resources which can be based on a dedicated ASIC embodying a Medium Access Control (MAC) controller 27 based on a microcontroller 21 MAC controller 27 that is particularly used for embodying Internet Protocol Security (IPSec) techniques. The LAN card 20 further includes a RJ45 connector 22 that connects the LAN card to an Ethernet network via a LAN cable 23. A transformer 24 achieves galvanic isolation from the network. A PHY element 25 (i.e., a special integrated circuit or functional block that provides physical access to a digital connection cable) is used for extraction of the analog signals from the receiver circuit (Rx), as well as the transmitter circuit (Tx) and the digital information extracted from MAC controller 27.

In addition to the traditional interprocess communication security features (IPsec), the MAC controller 27 and the microcontroller 21 include additional functionalities for exchanging data and commands with the network through a specific and protected protocol. The information being received-so called Overlay Control Information (OCI)—is used by microcontroller 21 to control the Overlay Frame Buffer 15 of the video card 10. For this purpose, the LAN card 20 i has PCI bus master capability for providing full control of the video card 10 connected to the PCI or AGP bus 9 under control of the OCI commands. In the case of an AGP connection for the video card 10, the bus master control of the LAN card 20 is achieved by means of a PCI to AGP bridge which is well known to tone of ordinary skill, and which will not be further described. Basically, when in the bus master mode, any device which is connected to the PCI bus 9 is given the possibility, under a defined protocol depending on the particular bus being considered—either PCI or AGP or—something similar to take the control of the latter. The PCI bus master mode is typically used for enabling one device to directly address the RAM storage of the computer without involving the main processor on the mother board. In the process which is hereinafter described the bus master mode is used to give the LAN card 20 direct access and control of the overlay frame buffer 15 of the video card 10 for the purpose of ascertaining that a specific reserved area of the display will display an important message or information, whatever the particular operating system and the software configuration of the machine.

When taking control of the PCI or AGP bus, the microcontroller 21 has access to the contents of overlay frame buffer 15 and can therefore control what is actually displayed in the protected and reserved areas of the display. This is achieved by a set of primitives which are executed by the microcontroller 21 to control the control bus of the PCI bus and therefore gain access to the primitives of the graphic engine 11 which controls the Overlay Frame Buffer 15. A particular primitive is used for accessing Overlay Frame Buffer 15 for the purpose of displaying the stored information in the foreground under control of the microcontroller 21 of the LAN card taking the PCI bus master. This is used for creating a direct communication channel between the LAN card 20 and the video card 10 independently of the execution of the main operating system and, above all, remaining out of control of the main operating system. The particular contents of the information which is displayed in such a mode are defined by the contents of the Overlay Control Data that are directly received through the network.

Therefore, a direct communication channel is provided between the LAN card 20 and the video card 10, which clearly ensures that specific information corresponding to the information contained within the Overlay Frame Buffer 15 is actually displayed in a specific area of the screen.

In one embodiment, the set of primitives of the graphic engine 11 controls the Z address which is used for defining the particular location of the overlay window which is displayed and which remains within the scope of access of the video card drivers under the control of the operating system. Therefore, the user is allowed to move and position the overlay window at any location on the screen, but is not given the possibility to suppress it.

In one embodiment, the Overlay Control Information (OCI) which is received by the LAN card includes a MAC address which is decoded by the microcontroller 21 for the purpose of determining whether the associated data is to be displayed within this particular computer. The use of the MAC address of the LAN card, with an appropriate protocol, the design of which can substantially vary in accordance with the particular needs, allows on-screen windows to be defined; the on-screen windows can be, in accordance with the particular situation, either broadcasted or unicasted. Clearly, this process remains out of control of the main operating system since the LAN card has direct access to the frame buffer control.

Figure 2:
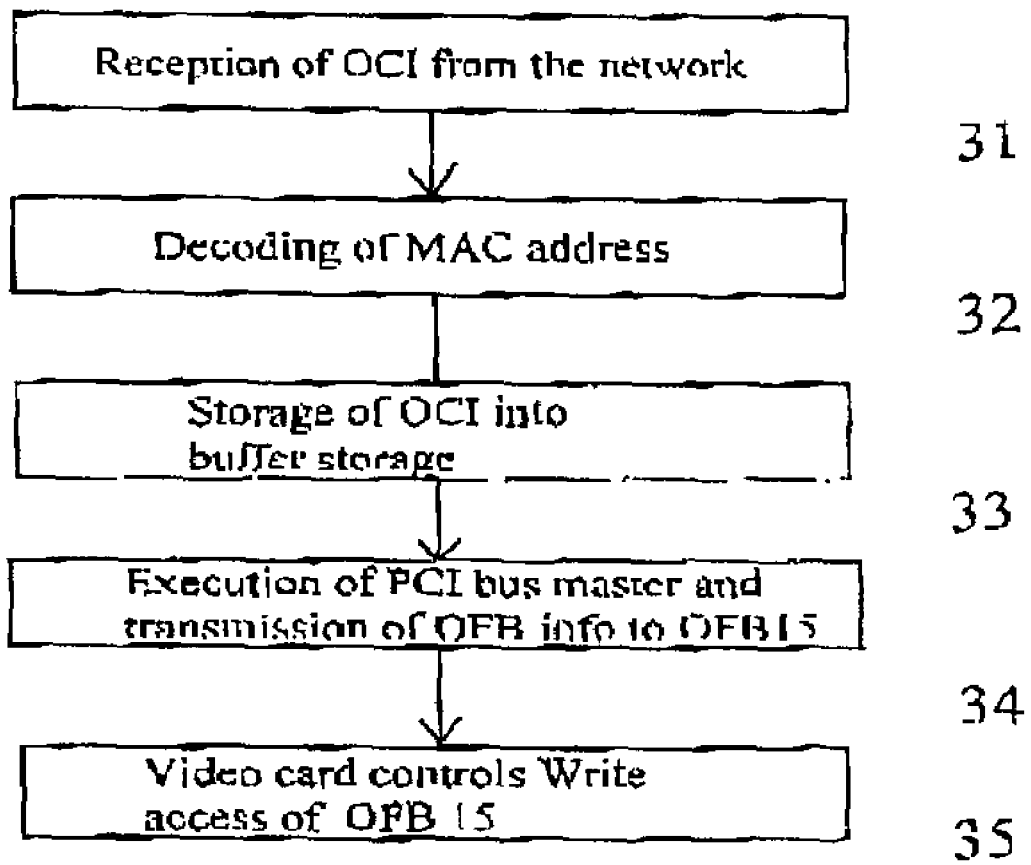
FIG. 2 is a flow chart of the process for controlling the message to be displayed in a reserved area of a display.

With respect to FIG. 2, there is described the process for controlling the contents of the Overlay Frame Buffer 15 of video card 10 via the microcontroller 21 of LAN card 20.

During step 31, microcontroller 21 receives Overlay Control (OCI) Information from the network.

During step 32, the microcontroller 21 decodes the MAC address existing within the OCI and determines whether the associated information is to be displayed on the particular display controlled by the video card 10. During step 32, there is processing of broadcast and unicast Overlay Control Information transmitted via the network.

If the MAC address matches that of the LAN card 20, the microcontroller 21 stores, during step 33, the OCI in its associated RAM storage.

During step 34, under control of the OCI received by the network, the LAN card 20 executes a PCI bus master and transmits the derived appropriate Overlay information to the graphic engine 11 of the video card 10.

During step 35, the graphic engine 11 controls the WRITE access to the Overlay Frame Buffer 15 for the purpose of displaying on the display 17 of the computer, the corresponding information received by the network. In the embodiment mentioned above, the user is given the ability to control the particular location of the Overlay windows that controls the Z address, but without having the ability to suppress the corresponding window.

In order to demonstrate the flexibility provided by the direct communication channel between the LAN card 20 and the video card 10, there will now be described a second mode of realization. In this alternate embodiment, the LAN card 20 controls the display on the overlay of sensitive information which is received from the network and which remains out of control of the main operating system of the computer connected to bus 9. For this purpose, when in bus master mode, the LAN card 20 prohibits any request from the main processor. As a result, the sensitive data which is currently displayed on the Overlay displayed information is secured. Therefore, the content of the Overlay frame buffer remains out of control of the main processor. This arrangement can be used for displaying to the customer sensitive information by an information service provider, while guaranteeing that this information will not be abusively processed by any corrupted software application present in the computer.

Preferably, the custom video card 10 is specifically designed for prohibiting any read operation within Overlay Frame Buffer 15. This is achieved by arranging Overlay Frame Buffer 15 in a different hardware memory storage device having different READ access procedures or, alternatively, by embodying those different READ access procedures directly within the same electronic module. By carrying out specific READ access restrictions within Overlay Frame Buffer 15, the information which is received by the LAN card 20 and displayed to the user can not be transmitted to any other process. It can be seen that this process is very useful for (1) guaranteeing the confidentiality of information being displayed to the user and, (2) preventing any misuse of that information by the different software applications which are likely to be installed within the computer. There is therefore provided a very protected environment for displaying sensitive information.

In addition to the restriction on the READ operation on the Overlay Frame Buffer, the security mechanism can be further improved by restricting a Write operation within the Overlay Frame Buffer 15. This can be achieved simply by employing a specific control lead between the video card 10 and the LAN card 20 in order to ensure that only the LAN card will provide the sensitive information to the protected area of the display associated with the Overlay Frame Buffer 15. Alternatively, the WRITE access restriction can be achieved by using an appropriate locking mechanism and procedure between the custom video card 10 and the LAN card 20.

The invention claimed is:

1. Process of displaying a window or a panel in a specific area of a display of a computer or an interactive terminal having (a) a main processor, (b) local access network (LAN) accessor with processing resources, the accessor being connected to a network, and (c) a graphic system with a frame buffer including an activated overlay frame buffer, said process comprising controlling the main processor to cause the frame buffer of the graphic system to produce graphic signals for the display in accordance with bitmaps or graphical commands derived by the main processor, and controlling said overlay frame buffer by using the processing resources of said LAN accessor to cause the display to display a specific window or panel independently of operation of a main operating system being executed on said computer or said interactive terminal, said graphic system and said LAN accessor being respectively based on a video card and a LAN card, said LAN card taking control of said overlay fame buffer by use of a bus master mode, and said overlay frame buffer having a WRITE access which is restricted to control by said LAN card.

2. Process according to claim 1, wherein said LAN card receives data and commands from the network in accordance with an appropriate protocol, said data defining information to be displayed in a secured secure area of said display and said commands taking control of the bus master mode of the contents of the frame buffer independently of an existing operating system.

3. Process according to claim 2 wherein the contents of said overlay frame buffer are displayed in a specific reserved area of the display which is moveable by the used but can not be suppressed.

4. Process according to claim 3 wherein said LAN card takes control of said video card by use of overlay control information (OCI) which contains a MAC address used for either broadcast or unicast transmission.

5. Process according to claim 4 wherein said overlay frame buffer has a READ access which is prohibited.

6. A personal computer or interactive terminal adapted to be responsive to a network and for controlling a display of the personal computer or terminal, the computer or terminal including
a main processor for deriving bitmaps or graphical commands, the main processor being adapted to be operated by an operating system,
local access network (LAN) accessor for receiving data and commands from said network and including a processor arrangement for processing said data and commands,
a graphic system connected to be responsive to the data and commands received by the LAN accessor and the bitmaps and graphical commands, the graphic system being arranged for providing graphic signals for the display in accordance with the bitmaps or graphical commands and the data and commands received by the LAN accessor, the graphic system having a frame buffer including an overlay frame buffer for storing the data received by the LAN accessor to be displayed on the display of said computer or said interactive terminal,
said LAN accessor being arranged for talking control of the contents of said overlay frame buffer independently of the operating system,
said LAN accessor and said graphic system being respectively based on a LAN card and a video card, said LAN card being arranged for taking control of said video card by use of a bus master mode, said overlay frame buffer having a WRITE access which is restricted to control of said LAN card.

7. A computer or an interactive terminal as defined in claim 6, wherein said video card includes a graphic engine having a primitive for moving the address corresponding to said overlay frame buffer which is accessible to said operating system, the graphic engine being arranged to enable a user is to be given the possibility to move but not to suppress a corresponding window or image.

8. A computer or an interactive terminal as defined in claim 7 wherein said LAN card includes a MAC controller for receiving and decoding overlay control information received from the network, the overlay control information including a MAC address, said LAN card being arranged for decoding overlay control information which is adapted to be broadcast for or unicast.

* * * * *